(12) United States Patent
Donze et al.

(10) Patent No.: US 9,969,934 B2
(45) Date of Patent: *May 15, 2018

(54) EROSION CONTROL SUBSTRATE AND METHODS OF USE

(71) Applicant: LSC Environmental Products, LLC, Apalachin, NY (US)

(72) Inventors: Joseph Donze, Chicopee, MA (US); Joel E. Lanz, Apalachin, NY (US)

(73) Assignee: LSC ENVIRONMENTAL PRODUCTS, LLC, Apalachin, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/118,315

(22) PCT Filed: Feb. 6, 2015

(86) PCT No.: PCT/US2015/014862
§ 371 (c)(1),
(2) Date: Aug. 11, 2016

(87) PCT Pub. No.: WO2015/123111
PCT Pub. Date: Aug. 20, 2015

(65) Prior Publication Data
US 2017/0174989 A1 Jun. 22, 2017

Related U.S. Application Data

(63) Continuation of application No. 14/445,513, filed on Jul. 29, 2014, now Pat. No. 9,193,634, which is a continuation-in-part of application No. 14/179,641, filed on Feb. 13, 2014, now Pat. No. 9,403,730.

(51) Int. Cl.

| | |
|---|---|
| *C09K 17/52* | (2006.01) |
| *C05G 3/04* | (2006.01) |
| *A01C 1/04* | (2006.01) |
| *A01C 7/00* | (2006.01) |
| *E02D 3/00* | (2006.01) |
| *E02D 17/20* | (2006.01) |
| *C05D 9/00* | (2006.01) |
| *C09K 17/40* | (2006.01) |
| *C05F 11/00* | (2006.01) |

(52) U.S. Cl.
CPC .............. *C09K 17/52* (2013.01); *A01C 1/04* (2013.01); *A01C 7/004* (2013.01); *C05D 9/00* (2013.01); *C05G 3/04* (2013.01); *C09K 17/40* (2013.01); *E02D 3/00* (2013.01); *E02D 17/202* (2013.01); *C05F 11/00* (2013.01)

(58) Field of Classification Search
CPC ........... C09K 17/52; A01C 1/04; A01C 7/004; C05G 3/04; E02D 3/00; E02D 17/202; B09B 1/004
See application file for complete search history.

(56) References Cited

U.S. PATENT DOCUMENTS

| | | |
|---|---|---|
| 3,072,635 A | 1/1963 | Menkart et al. |
| 3,489,719 A | 1/1970 | Savage et al. |
| 3,763,072 A | 10/1973 | Krieger |
| 4,917,733 A | 4/1990 | Hansen |
| 5,082,500 A | 1/1992 | Nachtman et al. |
| 5,161,915 A | 11/1992 | Hansen |
| 5,275,508 A | 1/1994 | Hansen |
| 5,385,429 A | 1/1995 | Hansen |
| 5,516,830 A | 5/1996 | Nachtman et al. |
| 5,525,009 A | 6/1996 | Hansen |
| 6,096,373 A | 8/2000 | Nachtman et al. |
| 7,544,243 B2 | 6/2009 | Hansen et al. |
| 7,752,804 B2 | 7/2010 | Spittle et al. |
| 8,029,616 B2 | 10/2011 | Hansen et al. |
| 8,256,158 B2 | 9/2012 | Spittle et al. |
| 8,256,159 B2 | 9/2012 | Spittle et al. |
| 9,193,634 B2 | 11/2015 | Donze et al. |
| 9,403,730 B2 | 8/2016 | Donze et al. |
| 2005/0084334 A1 | 4/2005 | Shi et al. |
| 2009/0120148 A1 | 5/2009 | Lougheed |
| 2011/0113983 A1 | 5/2011 | Bernu et al. |
| 2012/0282031 A1 | 11/2012 | Fischer |
| 2012/0283361 A1 | 11/2012 | Lsc |
| 2014/0154418 A1 | 6/2014 | Hansen |
| 2015/0225304 A1 | 8/2015 | Donze et al. |
| 2015/0225305 A1 | 8/2015 | Donze et al. |
| 2016/0304781 A1 | 10/2016 | Donze et al. |

OTHER PUBLICATIONS

International Search Report and Written Opinion for PCT/US2015/14862 dated Apr. 21, 2015.

*Primary Examiner* — Carib A Oquendo
(74) *Attorney, Agent, or Firm* — Heslin Rothenberg Farley & Mesiti P.C.

(57) ABSTRACT

An erosion control substrate and slurry are disclosed. The substrate includes mulch, a cover composition including bentonite clay and cellulosic water dispersible polymer and/or starch, and optionally surface-treated HPMC. Other desired optional ingredients may also be included. Methods of forming a slurry and methods of using the slurry for erosion control are also disclosed.

20 Claims, 4 Drawing Sheets

Photo 1. Pre-test conditions.

Photo 2. Test plot conditions after 30 minutes.

EROSION CONTROL SUBSTRATE AND METHODS OF USE

CROSS REFERENCE TO RELATED APPLICATIONS

This application is a U.S. National Phase filing under 35 U.S.C. § 371 of International Application No. PCT/US2015/014862, filed Feb. 6, 2015, and published as WO 2015/123111 A1 on Aug. 20, 2015, which claims priority to U.S. application Ser. No. 14/179,641, filed on Feb. 13, 2014, now U.S. Pat. No. 9,403,730, and to U.S. application Ser. No. 14/445,513, filed on Jul. 29, 2014, now U.S. Pat. No. 9,193,634, issued Nov. 24, 2015. The entire contents of each of the prior applications are hereby incorporated herein by reference.

FIELD OF THE INVENTION

This invention relates to compositions for use in hydroseeding, for example, for hydroseeding landfills. Particularly, the invention relates to sprayable cover materials for seeding.

BACKGROUND OF THE INVENTION

Hydroseeding is a process used for seeding large areas for vegetation growth. Hydroseeding may be used to seed an area in order to grow vegetation for soil erosion control, for instance, on sloped surfaces such as steep hillsides, or to replace lost vegetation after a large-scale fire. In other instances, landfill caps or other contaminated sites may be seeded. Grass may be applied by hydroseeding to large areas like golf courses.

Hydroseeding generally is performed by dispersing the hydroseed composition, which often includes water, seed and mulch, from a hose or a spray turret of a hydroseeding machine. For large-scale dispersion, tankers or helicopters are utilized.

There are a number of challenges with some currently used hydroseed. Some hydroseed is provided in a hard, brick-like format. This requires the user to break up the hydroseed brick prior to use, for instance, by using a hammer, so that the brick is adequately separated for application. Similarly, the hydroseed is prone to separating from water, especially if there is any delay in the use of the product once it is mixed. Current hydroseed products often clog the dispersal equipment, especially the hoses and pumps. Finally, the incorporated grass seed often tends to float in hydroseed, rather than remaining well dispersed.

Aspects of the present invention overcome these and other limitations of the prior art and provide an effective, easily applied hydroseed material.

SUMMARY OF THE INVENTION

The present invention provides an improved hydroseeding material and a method for applying the hydroseeding material to an area. In one aspect, the invention relates to a hydroseeding substrate. The hydroseeding substrate includes 1 part by weight of mulch; and 0.5 to 1.5 parts by weight of a cover composition. The cover composition includes about 50 to about 99 weight percent of a bentonite clay and 0.5 to about 25 weight percent cellulosic water dispersible polymer or starch. The cover composition may additionally comprise fiber, colorant, a mixture containing lipid essential oil and ethoxylated alkylphenol, synthetic polymer, soda ash, and/or cement.

In another aspect, the invention relates to a hydroseeding slurry. The hydroseeding slurry includes a hydroseeding substrate described herein, water, and seed. The hydroseeding slurry may also optionally include fertilizer and one or more soil adjuvants.

In another aspect, the invention relates to a method of forming a hydroseeding slurry. This method includes providing the hydroseeding substrate described herein; and mixing the hydroseeding substrate with water and seed. The method may also optionally include mixing with fertilizer and one or more soil adjuvants.

In another aspect, the invention relates to a method of seeding. This method includes providing the hydroseeding slurry recited herein and spraying the hydroseeding slurry on soil. In some situations, it is advantageous for the soil to be prepared to better receive the hydroseeding slurry. Soil preparation is well known in the art and will not be described here.

DETAILED DESCRIPTION OF THE INVENTION

Figure 1:
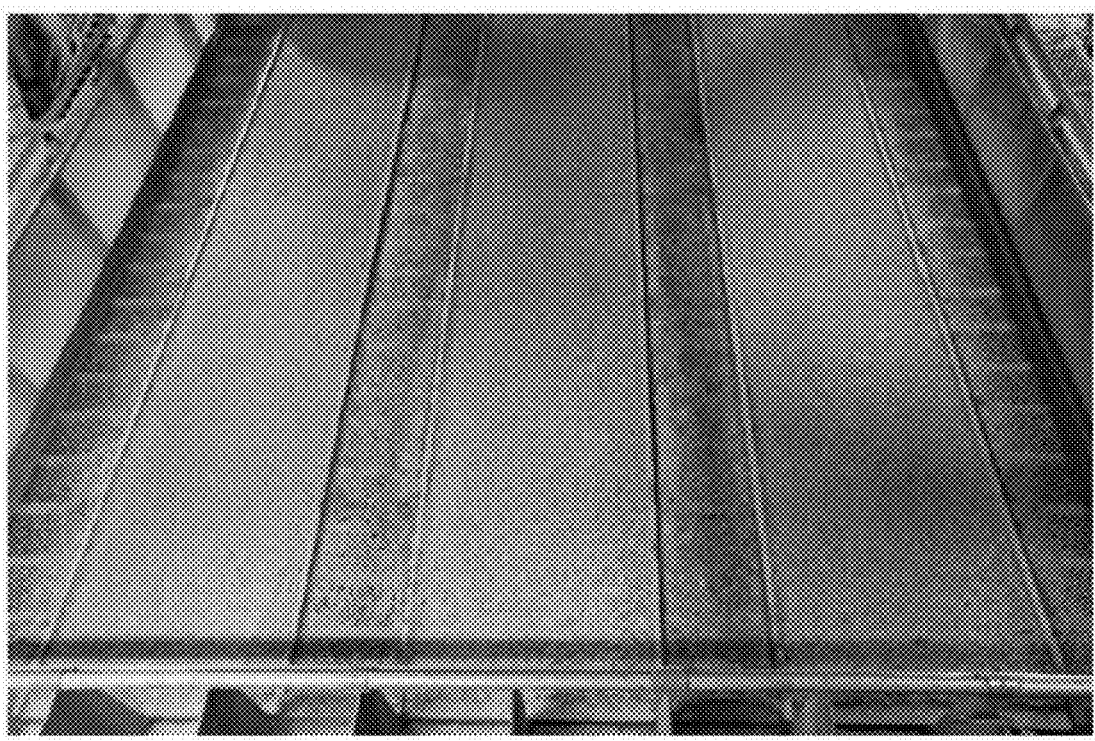
FIG. 1 is a photo showing pre-test conditions of test plots from run-off testing performed on embodiments of the inventive hydroseeding substrate.

Details of these aspects of the invention, as well as further aspects of the invention, will become more readily apparent upon review of the following detailed description and the accompanying claims.

The invention provides compositions and methods for hydroseeding of soils, often for areas that are sloped. The hydroseeding substrate comprises, in its simplest form, mulch, bentonite clay, and a water-dispersable polymer and/or starch. The compositions may additionally comprise fiber, colorant, a mixture containing lipid essential oil and ethoxylated alkylphenol, synthetic polymer, soda ash, and/or cement.

In one aspect, the invention provides a hydroseeding substrate. The hydroseeding substrate includes mulch and a cover composition. The cover composition includes bentonite clay and cellulosic water dispersible polymer or starch. In some embodiments, the hydroseeding substrate includes 1 part by weight of mulch. Any organic material, or mixtures of organic materials, may be used as mulch. For instance, bark, sawdust, woodchips, seashells, paper products (such as cardboard or newspaper), leaves, vegetation clippings (such as grass), straw, and/or manure may be used. In certain instances, non-organic materials, such as rubber, plastic, or rock, may be used as mulch. In some embodiments, the mulch is wood mulch.

In some embodiments, the hydroseeding substrate includes 0.5 to 1.5 parts by weight of a cover composition. In some embodiments, the hydroseeding substrate includes 0.5 to 1.0 parts by weight of a cover composition. In some embodiments, the hydroseeding substrate includes 1.0 to 1.5 parts by weight of a cover composition. In some embodiments, the hydroseeding substrate includes 0.75 to 1.25 parts by weight of a cover composition. In some embodiments, the hydroseeding substrate includes 0.75 to 1.0 parts by weight of a cover composition. In some embodiments, the hydroseeding substrate includes 1.0 to 1.25 parts by weight of a cover composition. In some embodiments, the hydroseeding substrate includes 0.8 to 1.2 parts by weight of a cover composition. In some embodiments, the hydroseeding substrate includes 0.7 to 1.1 parts by weight of a cover composition. In some embodiments, the hydroseeding substrate includes 0.9 to 1.1 parts by weight of a cover composition.

In one embodiment, the cover composition may be a product marketed under the registered trademark POSI-SHELL by LSC Environmental Products, LLC of Apalachin, N.Y. Products marketed by LSC Environmental Products, LLC include those described in U.S. Pat. Nos. 5,161,915; 5,275,508; 5,385,429; 5,525,009; 7,544,243; and 8,029,616. The cover composition includes bentonite clay, which provides a source of both substantivity and bulk. Bentonite clay enhances the smoothness and consistency of the mixture and also increases its tackiness and viscosity, enabling it to better adhere to soil and cohere to itself. Bentonite is an absorbent aluminium phyllosilicate, consisting mostly of montmorillonite. There are different types of bentonite, each named after the respective dominant element, such as potassium (K), sodium (Na), calcium (Ca), and aluminium (Al). For industrial purposes, two main classes of bentonite exist: sodium and calcium bentonites. Many forms of bentonite clay may be used in the cover composition. The bentonite clay may comprise commercial bentonite clay, for example, Hi-Yield bentonite provided by Wyo-Ben of Billings, Mont., or its equivalent. In one embodiment, the bentonite clay may be finely ground bentonite, for example, bentonite provided in the form of PSM-200™ setting agent provided by Landfill Service Corporation. PSM-200 setting agent typically contains finely ground natural bentonite clay (for example, which can pass through a minus 200 sieve), 97.5-98.5 wt %; a synthetic polymer, including 1-2 wt % untreated HPMC; soda ash (~0.5%); and optionally pregelatinized wheat starch.

In some embodiments, the cover composition includes about 50 to about 99 weight percent of a bentonite clay. In other embodiments, the cover composition includes about 90 to about 99 weight percent of a bentonite clay. In some embodiments, the bentonite clay is sodium bentonite, or its principal constituent, sodium montmorillonite.

The cover composition includes cellulosic water dispersible polymer or starch. In some embodiments, the cover composition includes about 0.5 to about 25 weight percent cellulosic water dispersible polymer or starch. In other embodiments, the cover composition includes about 0.5 to 5 weight percent cellulosic water dispersible polymer. All water-dispersible cellulosic polymers are envisioned, but those that are cold-water dispersible (i.e. under 40° C.) are preferred. Suitable polymers include one or more of methylcellulose, ethyl methyl cellulose, hydroxyethyl cellulose (HEC), hydroxypropyl cellulose, hydroxyethyl methyl cellulose, hydroxypropyl methyl cellulose (HPMC), ethyl hydroxyethyl cellulose and carboxymethyl cellulose. In certain embodiments, the cellulosic water dispersible polymer is hydroxypropyl methyl cellulose. In other embodiments, the water dispersible polymer or starch comprises pregelatinized wheat starch. As an adhesive agent in place of—or in addition to—the cellulosic polymer, one may include wheat starch, for instance, pregelatinized wheat starch.

In some embodiments, the cover composition additionally includes 0.01 to 0.15 parts by weight of fiber. In some embodiments, the cover composition additionally includes 0.05 to 0.1 parts by weight of fiber. In some embodiments, the cover composition additionally includes 0.05 to 0.15 parts by weight of fiber. In some embodiments, the cover composition additionally includes 0.05 to 0.075 parts by weight of fiber. The constituents which may be used as fibers include high density polyethylene, polyvinyl chloride, polypropylene, or polyethylene terephthalate polymer, as well as other types of plastics, shredded into thin hair-like fibers. In some embodiments, the hair-like fibers are between one-quarter to one-half inch in length. In some embodiments, the fibers are about one-quarter inch in length. In another aspect, the fiber may be cellulose fibers or synthetic fibers, for example, polyester fibers, such as those included in the formulation "P-100" provided by LSC Environmental Products. Polyethylene terephthalate fibers, such as LSC P-100 fiber, which are manufactured from recycled products such as plastic soda containers, have been found suitable. The polymer may be a semi-synthetic polymer, for example, a cellulosic water dispersible polymer, such as hydroxypropyl methyl cellulose (HPMC) treated water dispersible polymer or hydroxyethylcellulose (HEC) treated water dispersible polymer. In some aspects, the fibers may be treated with organic lubricants as a surface treatment, which allows the fibers to disperse in water. In some aspects, the fibers are 1 denier strands, and further may be pre-stretched and chopped to the desired length. In some embodiments, the fibers are pre-stretched, 1 denier strands of polyethylene terephthalate polymer treated organic lubricants as a surface treatment, chopped to 0.25 inch lengths.

The cover composition may optionally include a colorant. A colorant may be added to provide the desired opacity or to provide an aesthetically pleasing shade of color to the composition. In one aspect, the colorant may comprise any conventional coloring agent, for example, a mortar dye; for instance, TRUE-TONE® mortar dye provided by Davis Color Corporation may be added if desired, though other colorants may be used.

An essential oil may be included in the cover composition in certain applications, for instance, if a landfill, which may be odiferous, is to be seeded. An essential oil is a concentrated hydrophobic liquid containing volatile aroma compounds from plants. Essential oils are also known as volatile oils and ethereal oils or simply as the "oil of" the plant from which they were extracted, such as oil of clove. An oil is "essential" in the sense that it carries a distinctive scent, or essence, of the plant. Examples of essential oils include orange, lemon, lime, field mint (*Mentha arvensis*), peppermint, spearmint, wintergreen, menthol, camphor, anise, allspice, clove, almond, vanilla, celery, nutmeg, cassia (*Cinnamomum cassia*), ginger, sage, buchu (*Agathosma* sp.), cedarwood, eucalyptus, May chang (*Litsea cubeba*), sassafras, rosewood, sandalwood, pine, balsam, juniper, tea tree (*Melaleuca* sp.) and patchouli. Citrus oils (e.g. orange, lemon, lime) and mint oils (e.g. field mint (*Mentha arvensis*), peppermint, spearmint, wintergreen, menthol) are readily available, effective and relatively inexpensive, which recommend them for application in the compositions described herein. In certain embodiments of the compositions of the invention, tea tree, eucalyptus and pine oils may be absent.

Ethoxylated alkylphenols are well known in the surfactant and emulsifier art. Two common classes are the nonoxynols and the octoxynols, many embodiments of which are commercially available from Rhodia/Solvay as their IGEPAL® series of emulsifiers. The IGEPAL® CO series of nonyl phenoxy polyethoxy ethanols are preferred, and octoxynol-9 is particularly preferred.

A water-conditioning agent, for example soda ash ($Na_2CO_3$), may also be added to the compositions described above to improve the efficiency of the wetting of the bentonite. This property of soda ash may be particularly useful when hard water is used as the source of liquid for the composition. In some embodiments, soda ash may be introduced at, for instance, 0.5 to 10 weight percent of the bentonite. Other optional constituents that can be added to the compositions of the invention include Portland cement, cement kiln dust, fly ash, or stone dust, or any combination of these. In many embodiments, the composition will be free of zeolites, cyclodextrins, urease inhibitors, antimicrobials, borates, boric acid and metal salts other than alkali and alkaline earth metal salts. By "free of" it is meant that the named constituent is substantially absent; it may be present in trace, non-functional amounts as an impurity, typically less than 0.1% by weight.

In some embodiments, the hydroseeding substrate includes 1 part by weight of mulch and 0.5 to 1.5 parts by weight of a cover composition, and the cover composition includes about 50 to about 99 weight percent of a bentonite clay and about 0.5 to about 25 weight percent cellulosic water dispersible polymer or starch. In some embodiments, the hydroseeding substrate includes 1 part by weight of mulch and 0.5 to 1.5 parts by weight of a cover composition, and the cover composition includes 90 to 99 weight percent of a bentonite clay and 0.5 to 5 weight percent cellulosic water dispersible polymer. In some embodiments, the hydroseeding substrate includes 1 part by weight of mulch; 0.75 to 1.0 parts by weight of a cover composition; and 0.05 to 0.1 parts by weight of fiber. In some embodiments, the mulch in the hydroseeding substrate is wood mulch; and the cover composition includes 90 to 99 weight percent of sodium montmorillonite; and 0.5 to 5 weight percent hydroxypropyl methyl cellulose; and the fiber is polyethylene terephthalate polymer.

In some embodiments, the hydroseeding substrate additionally comprises 0.1 to 20 weight percent of surface-treated hydroxypropyl methyl cellulose (HPMC). Surface-treated HPMC is known in the art, and differs from HPMC (untreated) in that it has been chemically surface-treated (for example, non-limiting embodiments of surface-treated HPMC include those where HPMC has been surface-treated with, e.g., glyoxal) so as to achieve improved dispersibility in water. Thus, for example, while untreated HPMC is water dispersible, it is preferable that untreated HPMC first be mixed with dry material in order to maximize the homogeneity of its dispersal in an aqueous system. Surface-treated HPMC, on the other hand, achieves good dispersibility even when added directly to aqueous systems by itself.

Inclusion of the surface-treated HPMC in embodiments of the inventive products and methods is believed to strengthen affinity between the mulch and bentonite clay, thereby improving erosion protection and reduction of turbidity in run-off water.

In some embodiments, the hydroseeding substrate comprises 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 wt % surface-treated HPMC, including any and all ranges and subranges therein (e.g., 0.1-18 wt %, 0.75-5 wt %, 1-4 wt %, 1.5-3 wt %, etc.).

Mixing of the hydroseeding substrate may be accomplished in any convenient fashion. For instance, the hydroseeding substrate can be prepared by mechanically mixing the bentonite and, if not already present, the water-dispersable polymer. In one aspect the cover composition (that is, the dry powder) is mixed with the mulch to form the hydroseeding substrate. The hydroseeding substrate may then be provided in bulk or packaged in the form of unit packages. While these unit packages may be of any size, a weight of 50 or 100 pounds may be desirable.

Table I shows representative examples of the constituents of a 50-pound bag of the hydroseeding substrate. In these examples, the cover composition is PSM-200™ setting agent provided by Landfill Service Corporation:

TABLE I

| | Hydroseeding Substrate Examples (50 lb Bag) | | | | | |
|---|---|---|---|---|---|---|
| Example # | 1 | 2 | 3 | 4 | 5 | 6 |
| Wood Mulch (lbs) | 25 | 23.5 | 26.5 | 27.25 | 26.5 | 26.75 |
| Cover Composition (lbs) | 25 | 23.5 | 22.0 | 22.75 | 22 | 22.25 |
| Fiber (lbs) | 0 | 3 | 1.5 | 0 | 1.5 | 0 |
| Surface-Treated HPMC (lbs) | 0 | 0 | 0 | 0 | 0 | 0.5-1 |

In some embodiments, the invention relates to a hydroseeding slurry. This slurry contains a hydroseeding substrate described supra, water, seed, and optionally one or more of fertilizer and at least one soil adjuvant. According to aspects of the invention, the water used may be any source of water that is readily available and that would not be harmful to the seed or impermissible due to regulations related to groundwater contamination. As an example, untreated pond water or water that contains amounts of contaminants that would make it unsuitable as drinking water could be used as the source of the liquid.

The amount of water added to the hydroseeding substrate and the seed may be adjusted to accommodate the soil surface and the vegetation to be grown. For instance, a steeper slope may require the addition of less water to the hydroseeding substrate to provide a thicker slurry, while more water may be added in those situations where the soil is dryer or where the vegetation to be grown requires more liquid. In some embodiments, between 70 gallons and 100 gallons of water are added to 50 pounds of hydroseeding substrate. In some embodiments, between 80 gallons and 100 gallons of water are added to 50 pounds of hydroseeding substrate. In some embodiments, 80 gallons of water are added to 50 pounds of hydroseeding substrate.

Soil adjuvants, for purposes of this application, include any additive that may aid in the growth of the desired vegetation. Such adjuvants include, but are not limited to, additives which may adjust the pH of the growing medium (i.e., the soil and/or the hydroseeding substrate or slurry), additional fertilizers, or other nutrients. Additional adjuvants that may be added to change the viscosity or strength of the slurry, or to improve resistance to rain before cure, include cellulosic polymers (for example, Xtreme Rain Shield, LSC Environmental Products, LLC, Apalachin, N.Y.) additional fibers, or cement.

In order to facilitate the description of aspects of the present invention, the following discussion will primarily refer to the present invention as it is applied to hydroseeding grass. It will be apparent to those of skill in the art that the hydroseeding compositions and application process described may also be applied for other vegetation.

According to a further aspect, a method of forming a hydroseeding slurry is provided. This method includes providing the hydroseeding substrate described supra. The hydroseeding substrate is mixed with water and seed (and, if desired, other optional components such as fertilizer and/or one or more soil adjuvants) to prepare the hydroseeding slurry. The method is accomplished in any convenient fashion. For instance, in one embodiment, the water and hydroseeding substrate may be mixed first. The mixture may be mixed continuously with a mixing agitator while the ingredients are added. If preferred, seed for the desired vegetation, and optionally fertilizer and/or a soil adjuvant, such as a nutrient or a pH adjuster, may be added at this point. In another instance, water may be added to the hydroseeding substrate, seed, and optional fertilizer and/or soil adjuvant at the same time.

Typically, the mixture of liquid, hydroseeding substrate, seed, and optional additional ingredients may be allowed to thicken to form a viscid slurry with the consistency of pudding. The mixing time necessary to yield a mixture with the proper consistency may vary depending upon the percentage of each constituent added to the mixture. Once mixed, the composition may continue to be agitated, for example, slowly agitated. As an example, a commercial mixing device, such as a Landfill Service Corporation PSA 2000 Applicator mixer or its equivalent may be used. If the composition requires transport to the point of application, the mixture may be agitated during transport.

As a commercial example, a hydroseeding substrate of the invention may be brought to a job site. The user mixes the hydroseeding substrate with water and seed in a hydroseeding machine, in addition to any desired optional ingredients discussed herein, such as fertilizer. When the mixture is properly agitated, a spray applicator allows the mixture to be sprayed using a motion similar to spray painting. The resulting hydroseeding slurry is then sprayed on to the desired surface. In some embodiments, the surface is soil. The hydroseeding slurry may be applied in any thickness, as long as the thickness is sufficient to cover the desired surface (that is, the soil/landscape) without leaving gaps. The mixture is sprayed in such a manner that a uniform layer approximately one-sixteenth to one-half of an inch (1.5 mm to 13 mm) thick exists. It has been found that a thickness of one-quarter of an inch often will provide adequate coverage without wasting material, although thicker coverage may be used.

The hydroseeding slurry disclosed herein is "sticky", due to the presence of the bentonite clay in the hydroseeding substrate. This texture adds benefits: when grass seed is used with traditional hydroseed products, which are not sticky, it often will float and will not remain in suspension. However, the seed will "stick" to the clay of the disclosed hydroseeding slurry and remain in suspension, resulting in a more even application of seed. This stickiness also allows the hydroseeding slurry to be applied to vertical and highly sloped surfaces to grow vegetation. In short, the hydroseeding substrate gives the mixture better performance properties.

The combination of mulch and the cover composition disclosed herein overcomes many of the challenges found in prior art hydroseeding mixtures. The disclosed hydroseeding substrate is softer, and thus easier to separate, than traditional brick-like hydroseed products. Further, traditional hydroseed products tend to harden, while the hydroseeding slurry disclosed herein remains in a more liquid-like form. In some embodiments, the consistency of the hydroseeding slurry is of pudding. This consistency of the hydroseeding slurry not only prevents the clogging of hydroseeding machinery and equipment that one finds when using traditional hydroseeding products, but even allows the hoses and pumps being used to be lubricated. Further, the reliability of the consistency of the hydroseeding slurry results in a quicker, easier application process. Still further, it is found that inclusion of the surface-treated HPMC in embodiments of the invention leads to improved performance in rain durability, even before the hydroseeding slurry has dried. Thus, inventive embodiments also show extremely durable resistance to rain erosion even when wet.

Erosion Control Testing

Erosion control testing was performed on the non-limiting embodiments of the inventive hydroseeding substrate shown in Table 1.

TABLE 1

| Hydroseeding Substrate Examples (50 lb Bag) | | | |
|---|---|---|---|
| Example # | 4 | 5 | 6 |
| Wood Mulch (lbs) | 27.25 | 26.5 | 26.75 |
| Cover Composition (lbs) | 22.75 | 22 | 22.25 |
| Fiber (lbs) | 0 | 1.5 | 0 |
| Surface-Treated HPMC (lbs) | 0 | 0 | 1 |

Experimental Method

Rainfall Simulator

The rainfall simulator is a drip-type device in which raindrops are formed by water emitting from the ends of small diameter brass tubes. The rate of flow is controlled by admitting water into manifold chambers through fixed orifice plates under constant hydraulic pressure. Five separate inlet orifices are used in each chamber or simulator module. The ratios of the areas of the tubing to the orifices are 1, 2, 4, 8, and 16. By controlling the water flow to the orifices with electric solenoid valves and the water pressure with a movable head tank, it is possible to vary rainfall rate from approximately 2 to 25 inches per hour. The underside of each chamber or module is equipped with evenly spaced brass tubes. Each module is a 24-inch square enclosed box about 1-inch deep and oriented so that the ends of the tubes or needles form a horizontal plane to let the water drip to test plots below. Each module has 576 needles spaced on a 1-inch square grid pattern.

The rainfall simulator consists of 100 adjacent modules spaced to form a square rain simulation panel with a surface area of 400 square feet. Each module can be controlled separately. The 500 electrical control switches are manually actuated via a control panel.

Raindrop sizes are representative of typical high intensity storms. The spatial distribution of rain is essentially uniform.

Test Flume

The test products are applied over bare soil in a test flume. The square test flume measures approximately 20 feet on each side and can be tilted to any angle from horizontal up to approximately 1½:1 (H:V) slope. The rainfall simulator is supported over the flume so that rain falls directly onto the test plots. The plots contain a 1-foot depth of soil, supported by a metal grating covered with a filter cloth through which water can drain.

The flume can be divided into six 2-ft×19.5-ft test plots or three 4-ft×19.5-ft plots. The plots are separated from each other and from the sidewalls by 2-foot wide walkways. The rainfall simulator is operated such that the rain falls only on the plots and not upon the walkways.

Plot Configuration and Test Products

The test flume was configured with three 4-ft wide plots with each of the three plots configured differently. The test configurations are described in Table 2. This test was conducted with this configuration at a slope of 2.5H:1V.

TABLE 2

Test Product Description

| Product | Application | Plot No. |
|---|---|---|
| Example #4 | 3500 lb/acre* | 1 |
| Example #5 | 3500 lb/acre* | 2 |
| Example #6 | 3500 lb/acre* | 3 |

*11.0 gal of slurry per plot (mix: 31 lb fiber/50 gal water)

Test Procedures

Plot Preparation

The test plots were filled with a soil characterized as a loam to sandy loam, based on a soil laboratory analysis. Each plot was spaded through the full depth, cultivated with a garden tiller to a depth of approximately 6 inches, leveled with a rake, and compacted with a lawn roller filled with water. Following compaction, the soil surface is lightly broken up with a rake prior to the sediment control product application.

Product Application

The hydraulic products were mixed and applied using a lab-scale hydro-seeder. The dry product was applied by hand to the plot.

Rain Application

Prior to testing, the rainfall simulator was calibrated by tilting the test flume to the prescribed slope, covering the plots with a plastic sheet, setting a rainfall rate as indicated in Table 3, and measuring the runoff from each plot for approximately 2 minutes. The total volume of runoff was converted to water depth per time and compared with the indicated rainfall rate. Rainfall intensities for each plot were adjusted until the desired rainfall rate was achieved. Once the calibration was completed, the plastic sheet was quickly removed from the test plots to begin the test. The test conditions are shown in Table 3.

TABLE 3

Test Conditions

| Bed Slope (H:V) | 2.5:1 (H:V) |
|---|---|
| Rainfall Rate | 5 in/hr |
| Duration | 60 minutes |

Runoff Measurement

Figure 2:
FIG. 2 is a photo showing conditions after a first 30-minute test period from run-off testing performed on embodiments of the inventive hydroseeding substrate.
Figure 3A:
FIGS. 3A-B are photos showing conditions after a second 30-minute test period (thus following 60 minutes of testing) from run-off testing performed on embodiments of the inventive hydroseeding substrate.

The total runoff, including water, soil, and mulch was collected separately for each plot. In addition, the total runoff for each plot was also divided into runoff from the first and second 30-minute test periods for the post runoff test. The purpose for separating the two runoff periods is that sometimes the moisture absorption characteristic of the soil and sediment control product change as they approach a saturated condition and/or as rills form in the soil. Following the test, the total runoff for each plot was weighed. After the sediment had settled, the water was filtered off and the sediment dried and weighed. FIGS. 1, 2, and 3A-B show photos of the plots pre-test conditions, after the first 30-minute test period, and after the second 30-minute test period, respectively. In FIGS. 1, 2, and 3A, Plot 1 is the left plot, Plot 2 is the middle plot, and Plot 3 is the right plot. Each plot was 4 feet wide.

For Example #4, during testing, general raindrop damage occurred during the first 30 minutes, and continued to develop during the second 30 minutes, with some raindrop damage near the toe of the plot and a small rill formed in that same area. For Example #'s 5 and 6, general raindrop damage occurred during the first 30 minutes, and continued to develop during the second 30 minutes, with some raindrop damage near the toes of the plots.

The erosion control test results from the 60 minute rain simulation testing are provided in Tables 4, 5, and 6, for Example #'s 4, 5, and 6, respectively.

TABLE 4

Results for Example #4

| | 0 to 30 Minutes | 30 to 60 Minutes |
|---|---|---|
| Soil Runoff (lbs) | 7.86 | 19.54 |
| Water Runoff (lbs) | 424.29 | 646.88 |
| Sediment Runoff Rate (lbs/hr) | 15.72 | 39.08 |
| Water Runoff Rate (lbs/hr) | 848.58 | 1293.76 |
| C factor | 0.058411 | 0.105566 |
| Average C factor | 0.081988 | |
| Bare Soil Data | November 2004 | |
| Average Plant Height (in) | N/A | |
| Plant Density (%) | N/A | |

TABLE 5

Results for Example #5

| | 0 to 30 Minutes | 30 to 60 Minutes |
|---|---|---|
| Soil Runoff (lbs) | 5.90 | 15.89 |
| Water Runoff (lbs) | 443.10 | 670.73 |
| Sediment Runoff Rate (lbs/hr) | 11.80 | 31.78 |
| Water Runoff Rate (lbs/hr) | 886.20 | 1341.46 |
| C factor | 0.043838 | 0.085837 |
| Average C factor | 0.064838 | |
| Bare Soil Data | November 2004 | |
| Average Plant Height (in) | N/A | |
| Plant Density (%) | N/A | |

TABLE 6

Results for Example #6

| | 0 to 30 Minutes | 30 to 60 Minutes |
|---|---|---|
| Soil Runoff (lbs) | 5.971 | 10.28 |
| Water Runoff (lbs) | 362.73 | 592.94 |
| Sediment Runoff Rate (lbs/hr) | 11.94 | 20.55 |
| Water Runoff Rate (lbs/hr) | 725.46 | 1185.89 |
| C factor | 0.044380 | 0.055522 |
| Average C factor | 0.049951 | |
| Bare Soil Data | November 2004 | |
| Average Plant Height (in) | N/A | |
| Plant Density (%) | N/A | |

Turbidity Data

At 15-minute intervals (i.e, 15, 30, 45, and 60 minutes), ~250 mL of runoff were collected from each test plot. Samples were collected in 250 mL Nalgene bottles. Five separate turbidity tests were conducted per sample bottle. The turbidity test results are presented in Table 7.

TABLE 7

Turbidity Test Results

|  | Plot #1 (Example #4) | | | | Plot #2 (Example #5) | | | | Plot #3 (Example #6) | | | |
| --- | --- | --- | --- | --- | --- | --- | --- | --- | --- | --- | --- | --- |
| Sample # | 15 min | 30 min | 45 min | 60 min | 15 min | 30 min | 45 min | 60 min | 15 min | 30 min | 45 min | 60 min |
| 1 | 3826 | 3234 | 4073 | 3717 | 2729 | 2483 | 3283 | 2668 | 2165 | 1560 | 2129 | 1981 |
| 2 | 3940 | 3316 | 4025 | 3747 | 2818 | 2475 | 3208 | 2641 | 2155 | 1507 | 2138 | 2032 |
| 3 | 3923 | 3212 | 4004 | 3723 | 2873 | 2476 | 3193 | 2660 | 2114 | 1548 | 2194 | 1977 |
| Average: | 3896.3 | 3254.0 | 4034.0 | 3729.0 | 2806.7 | 2478.0 | 3228.0 | 2656.3 | 2144.7 | 1538.3 | 2153.7 | 1996.7 |

As evident from the foregoing, the embodiments of Example #'s 4-6 provide effective erosion protection.

Figure 3B:
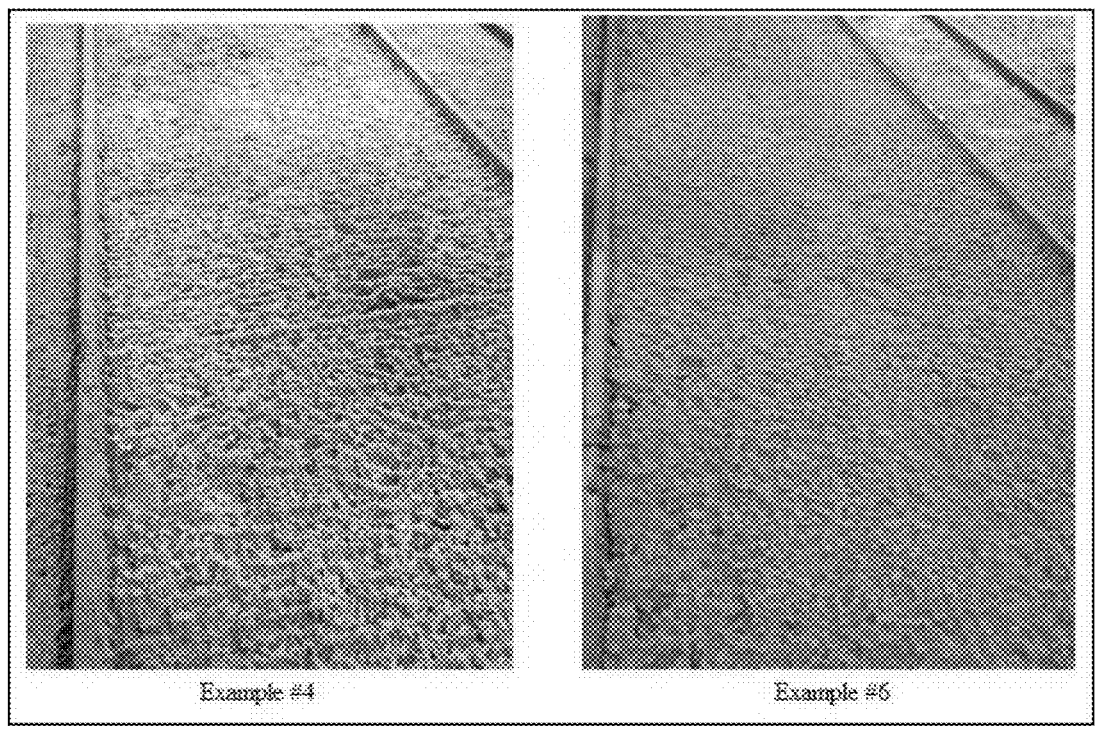

The addition of the surface-treated HPMC to the Example #6 hydroseeding substrate embodiment resulted in improved erosion control efficiency and lower turbidity in run-off water. Further, due to equipment used during the rain simulation, each rain drop falls in the same place on the test plots repeatedly in a grid pattern, as can be seen in FIG. 3B, which presents photos of Plot #1 (holding Example #4) and Plot #3 (holding Example #6) following 60-minutes of rain simulation testing. As evidenced by FIG. 3B, Example #6 exhibited a resistance to this "patterning effect," which may be an indication of increased bond strength between the wood fibers and the bentonite clay comprised within the product.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

Although this invention is susceptible to embodiment in many different forms, certain embodiments of the invention are shown. It should be understood, however, that the present disclosure is to be considered as an exemplification of the principles of this invention and is not intended to limit the invention to the embodiments illustrated. While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A substrate comprising:
    (A) 1 part by weight of mulch;
    (B) 0.5 to 1.5 parts by weight of a cover composition, wherein said cover composition comprises:
        (a) about 50 to about 99 weight percent of bentonite clay; and
        (b) about 0.5 to about 25 weight percent cellulosic water dispersible polymer and/or starch; and
    (C) 0.1 to 20 weight percent (wt %) surface-treated hydroxypropyl methyl cellulose (HPMC), where said wt % is based on the weight of the substrate.

2. The substrate according to claim 1, wherein said cover composition comprises:
    (a) 90 to 99 weight percent of a bentonite clay; and
    (b) 0.5 to 5 weight percent of the cellulosic water dispersible polymer.

3. The substrate according to claim 1, comprising the cellulosic water dispersible polymer, wherein said cellulosic water dispersible polymer comprises one or more members selected from the group consisting of methylcellulose, ethyl methyl cellulose, hydroxyethyl cellulose (HEC), hydroxypropyl cellulose, hydroxyethyl methyl cellulose, hydroxypropyl methyl cellulose (HPMC), ethyl hydroxyethyl cellulose and carboxymethyl cellulose.

4. The substrate according to claim 3, wherein the water dispersible polymer comprises untreated HPMC.

5. The substrate according to claim 1, comprising starch, wherein the starch comprises pregelatinized wheat starch.

6. The substrate according to claim 1, wherein the bentonite clay is sodium montmorillonite.

7. The substrate according to claim 1, wherein the mulch comprises a member selected from the group consisting of wood mulch and straw.

8. The substrate according to claim 1, wherein said cover composition additionally comprises 0.01 to 0.15 parts by weight of fiber.

9. The substrate according to claim 8, wherein the fiber is polyethylene terephthalate polymer.

10. The substrate according to claim 8, comprising:
(A) 1 part by weight of mulch;
(B) 0.75 to 1.0 parts by weight of cover composition;
(C) 1 to 4 weight percent (wt %) surface-treated HPMC, where said wt % is based on the weight of the substrate; and
(D) 0.05 to 0.15 parts by weight of fiber.

11. The substrate according to claim 1, comprising:
(A) 1 part by weight of mulch;
(B) 0.75 to 1.0 parts by weight of cover composition, said cover composition comprising:
(a) 90 to 99 weight percent of sodium montmorillonite; and
(b) 0.5 to 5 weight percent untreated HPMC; and
(C) 1 to 4 wt % surface-treated HPMC, where said wt % is based on the weight of the substrate.

12. The substrate according to claim 11, wherein said mulch comprises wood mulch.

13. The substrate according to claim 1, wherein said cover composition additionally comprises at least one member selected from the group consisting of:
(D) fiber;
(E) colorant;
(F) a mixture containing at least some lipid essential oil and at least some ethoxylated alkylphenol;
(G) synthetic polymer;
(H) soda ash; and
(I) cement.

14. The substrate according to claim 1, wherein said surface-treated HPMC has been surface-treated with glyoxal.

15. A slurry comprising:
the substrate of claim 1;
water; and
optionally one or more members selected from the group consisting of fertilizer, seed, and soil adjuvant.

16. A method of controlling or reducing erosion of a surface, the method comprising:
mixing the substrate of claim 1 with water to form a slurry; and
applying said slurry on the surface.

17. The method according to claim 16, wherein the surface comprises soil.

18. The method according to claim 16, wherein applying said slurry comprises spraying said slurry on the surface, thereby forming a slurry layer having a thickness of 1.5 mm to 13 mm.

19. The method according to claim 16, wherein the cover composition comprises:
(a) 90 to 99 weight percent of a bentonite clay; and
(b) 0.5 to 5 weight percent cellulosic water dispersible polymer.

20. The method according to claim 16, wherein the water dispersible polymer or starch comprises one or more members selected from the group consisting of methylcellulose, ethyl methyl cellulose, hydroxyethyl cellulose (HEC), hydroxypropyl cellulose, hydroxyethyl methyl cellulose, hydroxypropyl methyl cellulose (HPMC), ethyl hydroxyethyl cellulose and carboxymethyl cellulose.

* * * * *